US010227002B2

(12) United States Patent
Sato et al.

(10) Patent No.: US 10,227,002 B2
(45) Date of Patent: Mar. 12, 2019

(54) VEHICLE DISPLAY SYSTEM AND METHOD OF CONTROLLING VEHICLE DISPLAY SYSTEM

(71) Applicant: SUBARU CORPORATION, Tokyo (JP)

(72) Inventors: Noeru Sato, Tokyo (JP); Takeshi Torii, Tokyo (JP); Ryuichi Sumikawa, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/898,257

(22) Filed: Feb. 16, 2018

(65) Prior Publication Data

US 2018/0264941 A1 Sep. 20, 2018

(30) Foreign Application Priority Data

Mar. 15, 2017 (JP) .................. 2017-050344

(51) Int. Cl.
*B60Q 1/50* (2006.01)
*B60K 28/02* (2006.01)
(Continued)

(52) U.S. Cl.
CPC .............. *B60K 28/02* (2013.01); *B60K 35/00* (2013.01); *B60Q 1/50* (2013.01); *G02B 27/0101* (2013.01);
(Continued)

(58) Field of Classification Search
CPC ................... B60K 28/02; B60K 35/00; B60K 2350/1096; B60K 2350/962;
(Continued)

(56) References Cited

U.S. PATENT DOCUMENTS 7,046,245 B2 * 5/2006 Cerny .................. G06T 15/506
345/426
7,847,705 B2 * 12/2010 Kido ...................... B60K 35/00
340/815.4
(Continued)

FOREIGN PATENT DOCUMENTS

JP 03-056448 A 3/1991
JP 11-110697 A 4/1999
(Continued)

OTHER PUBLICATIONS

Y. Maruyama et al., "Introduction of Driver Monitoring System," Oki Technical Review, Issue 220, vol. 79, No. 2, Nov. 2012, pp. 16-19, with English translation.
(Continued)

*Primary Examiner* — Daryl C Pope
(74) *Attorney, Agent, or Firm* — McDermott Will & Emery LLP

(57) ABSTRACT

A vehicle display system includes a display device, a driver state determiner, and a display controller. The display device is configured to provide a display on a window in a rear portion of a vehicle. The driver state determiner is configured to determine whether a driver of the vehicle checks a rear area of the vehicle. The display controller is configured to control displaying of the display device to change the display provided by the display device in accordance with a determination result of the driver state determiner.

12 Claims, 7 Drawing Sheets

(51) Int. Cl.
*B60K 35/00* (2006.01)
*G02B 27/01* (2006.01)

(52) U.S. Cl.
CPC *B60K 2350/1096* (2013.01); *B60K 2350/962* (2013.01); *B60R 2300/205* (2013.01); *B60R 2300/8066* (2013.01)

(58) Field of Classification Search
CPC .......... G02B 27/0101; B60R 2300/205; B60R 2300/8066; B60Q 1/50
USPC ................ 340/438, 425.5, 932.2, 937
See application file for complete search history.

(56) References Cited

U.S. PATENT DOCUMENTS

| | | | |
|---|---|---|---|
| 8,493,199 B2 * | 7/2013 | Koehler | B62D 15/0285 180/272 |
| 2004/0036769 A1 | 2/2004 | Sadahiro | |

FOREIGN PATENT DOCUMENTS

| JP | 2004-082835 A | 3/2004 |
|---|---|---|
| JP | 2004-318266 A | 11/2004 |
| JP | 2006-135797 A | 5/2006 |
| JP | 2007-331506 A | 12/2007 |
| JP | 2014-092965 A | 5/2014 |
| JP | 2015-186944 A | 10/2015 |

OTHER PUBLICATIONS

Japanese Office Action issued in corresponding Japanese Paent Application No. 2017-050344, dated Aug. 14, 2018, with English Translation.

Japanese Office Action issued in corresponding Japanese Patent Application No. 2017-050345, dated Sep. 25, 2018, with English Translation.

Non-Final Office Action issued in related U.S. Appl. No. 15/898,255, dated Jun. 28, 2018.

\* cited by examiner

VEHICLE DISPLAY SYSTEM AND METHOD OF CONTROLLING VEHICLE DISPLAY SYSTEM

CROSS-REFERENCE TO RELATED APPLICATIONS

The present application claims priority from Japanese Patent Application No. 2017-050344 filed on Mar. 15, 2017, the entire contents of which are hereby incorporated by reference.

BACKGROUND

The technology relates to a vehicle display system and a method of controlling the vehicle display system.

Japanese Unexamined Patent Application Publication (JP-A) No. 2004-082835 discloses a technique that, when a driver checks a rear area of a vehicle, an appropriate location and orientation of a display unit is determined on the basis of states of the vehicle and passengers sitting on seats and a driver's rearward view. Then, the location and orientation of the display unit is changed.

Nowadays, a technique in which a state of a person is recognized on the basis of image information on his/her face is commonly used. As an example, Yuto Maruyama and Atsuko Matsuoka, "Introduction of Driver Monitoring System." Oki Technical Review, issue 220, volume 79, No. 2, November 2012, discloses a technique in which a state of a driver of a vehicle is monitored through facial recognition while the vehicle is running.

SUMMARY

An aspect of the technology provides a vehicle display system that includes: a display device configured to provide a display on a window in a rear portion of a vehicle; a driver state determiner configured to determine whether a driver of the vehicle checks a rear area of the vehicle; and a display controller configured to control displaying of the display device to change the display provided by the display device in accordance with a determination result of the driver state determiner.

An aspect of the technology provides a method of controlling a vehicle display system. The method includes determining whether a driver riding a vehicle checks a rear area of the vehicle. The vehicle includes: a window in its rear portion; and a display device configured to provide a display on the window. The method further includes controlling displaying of the display device to change the display provided by the display device in accordance with a determination result acquired from the determining.

An aspect of the technology provides a vehicle display system that includes: a display device configured to provide a display on a window in a rear portion of a vehicle; and circuitry configured to make a determination whether a driver of the vehicle checks a rear area of the vehicle and control displaying of the display device to change the display provided by the display device in accordance with a result of the determination.

DETAILED DESCRIPTION

Figure 1:
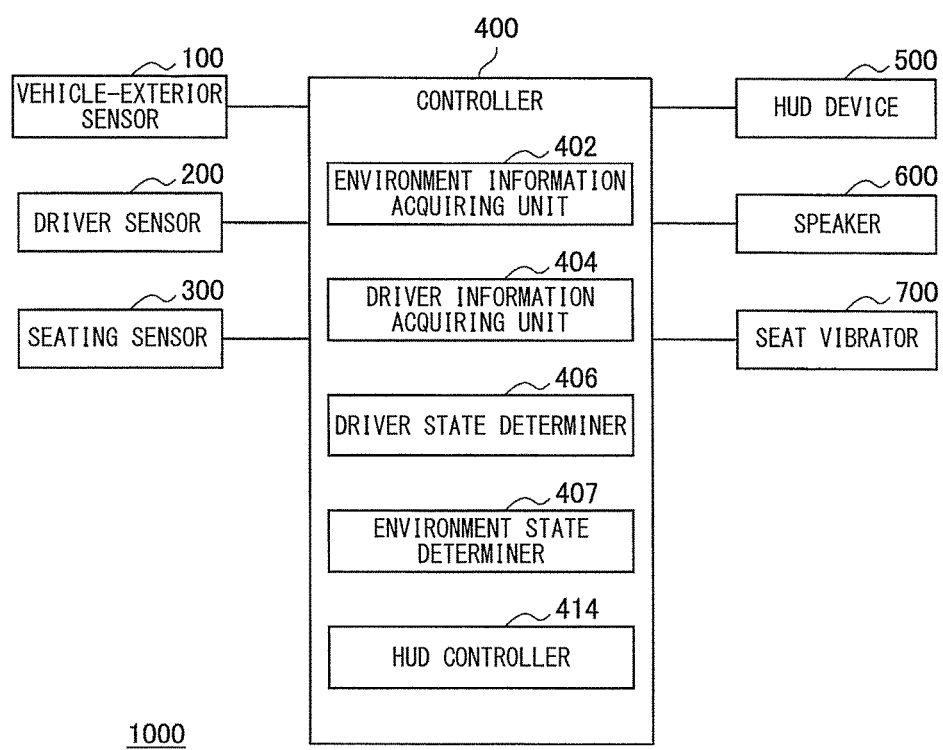
FIG. 1 schematically illustrates an example of a configuration of a vehicle display system according to one implementation of the technology.

When a display is provided on a window in a rear portion of a vehicle, which is referred to below as a rear window, a content of the display preferably changes depending on whether a driver checks a rear area of the vehicle.

It is desirable to provide a vehicle display system and a method of controlling a vehicle display system that, when providing a display on a rear window of a vehicle, both make it possible to optimize the display depending on whether a driver checks a rear area of the vehicle.

In the following, some non-limiting implementations of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In an exemplary case where a display on a rear window of a vehicle is provided, when a driver keeps viewing a front area of the vehicle without checking a rear area of the vehicle, a content of the display on the rear window is preferably optimized for a target viewer, such as but not limited to a driver of another vehicle following the vehicle. Once the driver checks the rear area of the vehicle, however, the content of the display may change in accordance with his/her legibility. This is because the content of the display optimized for the target viewer does not necessarily coincide with that for the driver of the vehicle.

A technique disclosed in JP-A No. 2004-082835 may fail to suggest that a content of a display provided on a rear window of a vehicle changes depending on whether a driver checks a rear area of the vehicle.

At least one implementation of the technology provides a vehicle display system and a method of controlling a vehicle display system that, when providing a display on a rear window of a vehicle, i.e., a window in a rear portion of the vehicle, both make it possible to optimize the display depending on whether a driver checks a rear area of the vehicle.

FIG. 1 schematically illustrates an example of a configuration of a vehicle display system 1000 according to one implementation of the technology. The vehicle display system 1000 may be basically mounted in a vehicle. The vehicle may be, for example but not limited to, an automobile. Referring to FIG. 1, the vehicle display system 1000 may include vehicle-exterior sensors 100, a driver sensor 200, a seating sensor 300, a controller 400, a HUD device 500, speakers 600, and seat vibrators 700.

Each of the vehicle-exterior sensors 100 may be a stereo camera, a monocular camera, millimeter wave radar, an infrared sensor, or any other sensing device. Each vehicle-exterior sensor 100 may measure a parameter such as, but not limited to, a position and speed of an object. Non-limiting examples of the object may include a vehicle and a person around the vehicle. In an example implementation, each vehicle-exterior sensor 100 may be a stereo camera that includes a pair of right and left cameras each having an imaging device such as, but not limited to, a charge-coupled device (CCD) sensor or a complementary metal-oxide semiconductor (CMOS) sensor. Then, the stereo camera may capture an image of an environment outside a vehicle and transmit information on the captured image to the controller 400. In an example implementation, the stereo camera may be a color camera disposed on an upper portion of a windshield of the vehicle and be able to acquire color information.

The HUD device 500 may be a display device that displays information directly in a human visual field. For example, the HUD device 500 may display a real image on a window such as, but not limited to, the windshield or a rear window of the vehicle as the window in the rear portion of the vehicle. Although a known HUD device typically displays a virtual image, the HUD device 500 in this implementation may be a display device that displays a real image. The HUD device 500 may display a real image at a viewing angle of about 360 degrees, thereby allowing both persons inside and outside the vehicle to view the image. In an alternative implementation, however, the HUD device 500 may display a virtual image.

Figure 2:
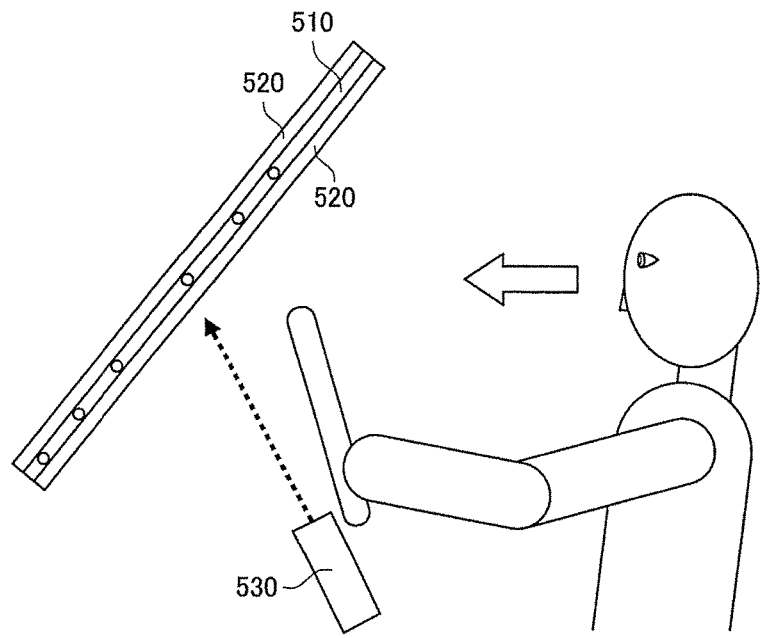
FIG. 2 schematically illustrates an example of a head-up display (HUD) device that includes a self-luminous interlayer film.

In one specific but non-limiting implementation, the HUD device 500 may be a device that includes a self-luminous interlayer film 510, as illustrated in FIG. 2. In such an implementation, the self-luminous interlayer film 510 may be disposed between two sheets of glass 520 in the window of the vehicle such as, but not limited to, the windshield and the rear window. The self-luminous interlayer film 510 may contain a luminescence material. When a portion of the self-luminous interlayer film 510 is irradiated with laser light from a projector 530 mounted in the vehicle, the irradiated portion may emit light, displaying objects, including characters and images. The objects may have visibility at all angles and may be thus viewable not only from the driver seat but also from the other seats as well as any location outside the vehicle. In an alternative implementation, the HUD device 500 may have a configuration in which a self-luminous device is disposed at the window of the vehicle. In such an alternative implementation, the HUD device 500 may have a transparent screen that contains an organic electroluminescence (EL) element, a transmissive liquid crystal device, or any other member that allows for transmissive displaying. In a further alternative implementation, any device other than the HUD device 500 may be used as the display device. In such an alternative implementation, a large-sized liquid crystal display device, a light-emitting diode (LED) display device, or any display device provided on a member such as, but not limited to, an instrument panel may be used as the display device. In the following, a description is given of one implementation in which the HUD device 500 provides a display on the window, such as the windshield and the rear window, of the vehicle. In one implementation, the HUD device 500 may serve as a "display device". The display device according to any implementation of the technology, however, is not limited to the HUD device 500. The term "HUD device" or "display device" according to any implementation of the technology encompasses any and all display devices provided inside and/or outside a vehicle. In an example implementation, the display device may be provided at any external site of the vehicle other than the window, such as a body of the vehicle. In an example implementation, the display device may be provided at any internal site of the vehicle other than the window, such as the instrument panel and a seat. The display devices disposed inside and outside the vehicle may be provided integrally with or separately from each other.

The driver sensor 200 may be implemented by a camera, a line-of-sight sensor, a motion sensor, or any other sensing device. This driver sensor 200 may measure movements of the driver's arms and head, a direction of his/her line of sight, and any other parameters related to the driver. In an example implementation where the driver sensor 200 is a camera, the driver sensor 200 may acquire the movements of the arms and head, the direction of the line of sight, and any other parameters by subjecting an image captured by the camera to image processing. In another example implementation where the driver sensor 200 is a line-of-sight sensor, the driver sensor 200 may detect the line of sight by using a corneal reflection method or any other similar method. The seating sensors 300 may be provided in the respective seats of the vehicle, and each of the seating sensors 300 may determine whether a person sits on a corresponding seat. The speakers 600 may emit a warning sound toward the inside and outside of the vehicle when the HUD device 500 displays a warning to persons inside and outside of the vehicle. The seat vibrators 700 may be provided in the respective seats inside the vehicle. In addition, the seat vibrators 700 may vibrate the corresponding seats to give a warning to the driver and occupants when the HUD device 500 displays a warning inside the vehicle.

The controller 400 may control the displaying of the HUD device 500 on the basis of the information detected by the vehicle-exterior sensors 100, the driver sensor 200, and other sensors. The controller 400 may include an environment information acquiring unit 402, a driver information acquiring unit 404, a driver state determiner 406, an environment state determiner 407, and a HUD controller 414. In one implementation, the HUD controller 414 may serve as a "display controller". In one implementation, the environment state determiner 407 may serve as a "following vehicle information determiner". Each of the components of the controller 400 may be implemented in hardware or in software. In an example implementation where one component of the controller 400 is implemented in hardware, this component may be circuitry. In another example implementation where one component of the controller 400 is implemented in software, this component may be a program that causes a central processing unit (CPU) or other processor to perform its function.

The environment information acquiring unit 402 may acquire information on a distance to a target, namely, a subject in this case. This information may be called distance information. In an example implementation, the environment information acquiring unit 402 may generate the distance information, on the basis of an amount of shift between corresponding locations in a pair of right and left stereo images and by means of principle of triangulation. The pair of right and left stereo images may be captured by a set of right and left cameras of the stereo camera which constitutes each vehicle-exterior sensor 100 in one implementation. Together with the acquisition of the distance information, the environment information acquiring unit 402 may also acquire information on a location of the subject from the information on the images captured by the set of right and left cameras of the stereo camera which constitutes each vehicle-exterior sensor 100. This information may be called image information. Further, the environment information acquiring unit 402 may perform a known grouping process on the distance information generated by the principle of triangulation. Then, the environment information acquiring unit 402 may obtain data on a three-dimensional object, a lane line, and other objects by comparing the distance information subjected to the grouping process with preset three-dimensional data such as, but not limited to, three-dimensional object data. By performing the processes in this manner, the controller 400 is able to recognize various entities, including a person, another vehicle, a stop sign, a stop line, and an electronic toll collection (ETC) gate.

On the basis of the information on the distance to a factor generated by the principle of triangulation, the environment information acquiring unit 402 may also calculate a variation in the distance to the factor and/or a speed relative to the factor. Non-limiting examples of the factor may include a person and another vehicle. The variation in the distance may be determined by integrating distances to the factor in frame images. The frame images may be acquired at regular time intervals. The relative speed may be determined by dividing the distances acquired at regular time intervals by the unit time.

In the above manner, the environment information acquiring unit 402 may acquire the image information regarding an environment outside the vehicle, from the vehicle-exterior sensors 100. In addition, the environment information acquiring unit 402 may analyze the acquired image information through an image analyzing process. As a result of analyzing the image information, the environment information acquiring unit 402 may acquire environment information regarding the environment outside the vehicle.

Figure 3:
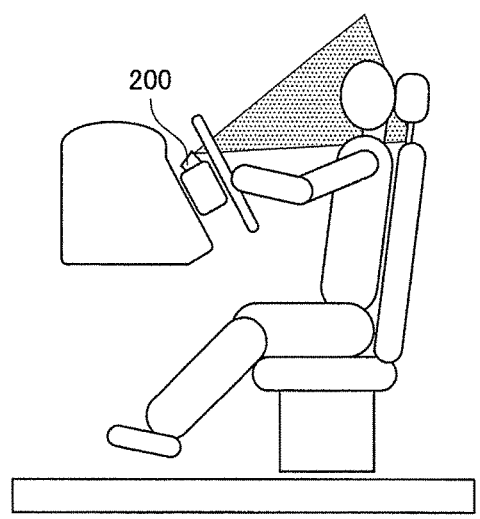
FIG. 3 schematically illustrates an example of a state where a driver sensor captures an image of a driver of a vehicle.

FIG. 3 schematically illustrates an example of a state where the driver sensor 200 captures an image of the driver if the driver sensor 200 is implemented by a camera. As illustrated in FIG. 3, as an example, the driver sensor 200 may be mounted on an upper portion of a steering column.

In an example implementation where the driver sensor 200 is a camera, the image captured by the driver sensor 200 may be supplied to the controller 400. Then, the driver information acquiring unit 404 may acquire a face region of the driver from the received image through an image processing technique such as, but not limited to, an edge and face detection technique. The driver information acquiring unit 404 thereby may acquire an orientation of the face on the basis of the face region. The driver state determiner 406 may determine whether the driver looks aside, on the basis of the face orientation. Moreover, the driver information acquiring unit 404 may obtain information on locations of feature points of predetermined parts of the face, which is called location information.

Non-limiting examples of the predetermined parts of the face may include the eyes, the nose, and the mouth. On the basis of this location information, then, the driver state determiner 406 may determine a state of the driver. In an example implementation, the driver state determiner 406 may determine a possibility that the driver looks ahead without due care because of drowsiness or sleeping, for example.

Figure 4:
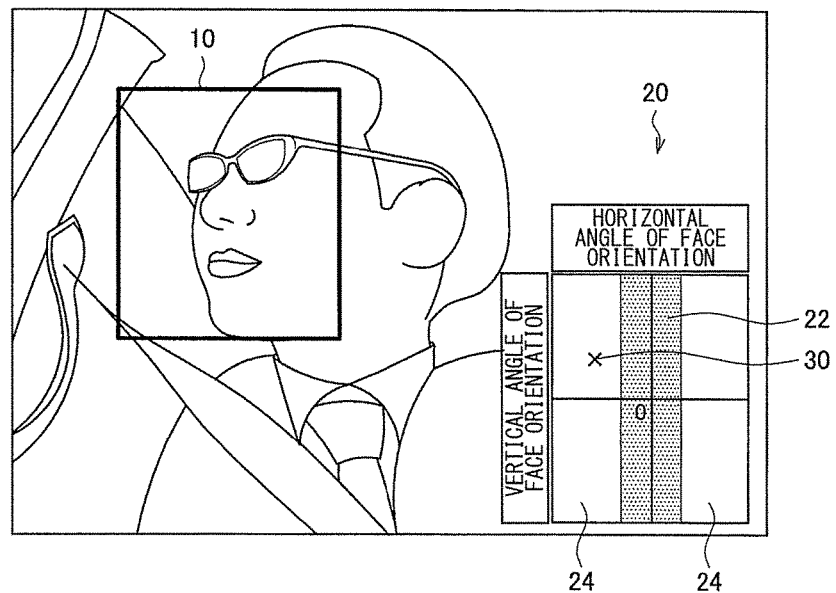
FIG. 4 schematically illustrates an example of a manner in which an angle at which a driver's face is oriented and other face-related factors are calculated on the basis of a face region of the driver.

FIG. 4 schematically illustrates an example of a manner in which an angle at which a driver's face is oriented and other face-related factors are calculated on the basis of a face region 10 of the driver which has been detected. On the basis of the face region 10 of the driver which has been acquired from the image information, the driver state determiner 406 may monitor whether the face orientation of the driver falls outside a predetermined region, thereby making it possible to determine a possibility that the driver looks aside. In this case, the face region 10 of the driver may be defined from the location information on the feature points of the parts, including the eyes, the nose, and the mouth, of the face. In order to estimate the face orientation, as an example, the driver state determiner 406 may use, as a reference, a distance between the eyes as seen from the front and then may compare this reference with a distance between the eyes obtained from the image information. It may be determined that, as the distance between the eyes obtained from the image information becomes smaller than the reference, the face is oriented sideways more largely as seen from the front.

FIG. 4 illustrates a detection result 20 at its lower right. In the detection result 20, the vertical axis represents "vertical angle of face orientation", the horizontal axis represents "horizontal angle of face orientation", and an X-mark 30 denotes "detected angles of face orientation". In the detection result 20, a shaded, rectangular area at the center may be a front region 22. If detected angles of the face orientation fall within the front region 22, the driver state determiner 406 may determine that the driver looks ahead. If the detected angles are shifted from within the front region 22 to within one of right and left side regions 24, as indicated by the X-mark 30, the driver state determiner 406 may determine that there is a possibility that the driver looks aside. Thresholds used to differentiate the front region 22 and the right and left side regions 24 from one another may be varied as appropriate. In one example implementation, the thresholds may be set to about −20 degrees and +20 degrees in the horizontal direction. In one example implementation, whether the driver looks aside may be determined in the following manner. First, a ratio of a period over which the angles of the face orientation stay within one of the right and left side regions 24 to a reference period may be calculated. Then, if the calculated ratio exceeds a predetermined threshold, it may be determined that the driver looks aside. In an alternative example implementation, if the angles of the face orientation continue to fall outside a predetermined range over a predetermined period or if the driver sensor 200 successively fails to detect the driver's face over a predetermined period, the driver state determiner 406 may determine that the driver looks aside.

In one implementation, the driver state determiner 406 may determine whether the driver looks at a rearview mirror, on the basis of the face orientation of the driver. In addition, the driver state determiner 406 may also determine whether the driver faces backward, on the basis of the face orientation of the driver. To determine whether the driver looks at the rearview mirror, the driver state determiner 406 may refer to the "vertical angle of face orientation" and the "horizontal angle of face orientation" in the detection result 20. Then, if the "vertical angle of face orientation" and the "horizontal angle of face orientation" coincide with those at which the driver looks at the rearview mirror, the driver state determiner 406 may determine that the driver looks at the rearview mirror. Likewise, to determine whether the driver faces backward, the driver state determiner 406 may refer to the "horizontal angle of face orientation" in the detection result 20. Then, if the "horizontal angle of face orientation" is equal to or more than a preset angle θ, the driver state determiner 406 may determine that the driver faces backward.

The environment state determiner 407 in the controller 400 may determine information on an environment outside the vehicle, on the basis of the environment information acquired by the environment information acquiring unit 402. In one example implementation, the environment state determiner 407 may set a person and other vehicle outside the vehicle to targets outside the vehicle and determine their states.

The HUD controller 414 may control the displaying of the HUD device 500. In one specific but non-limiting implementation, the HUD controller 414 may control the displaying of the HUD device 500, on the basis of the processes performed by the environment information acquiring unit 402, the driver information acquiring unit 404, the driver state determiner 406, and the environment state determiner 407.

In one implementation, when providing a display on the rear window, the HUD device 500 may selectively employ different display modes, depending on whether the driver views the display on the rear window through the rearview mirror or faces backward to directly view the display on the rear window. The determination as to whether the driver looks at the rearview mirror or faces backward may be made by the driver state determiner 406 on the basis of the information acquired from the driver sensor 200.

For example, when the HUD device 500 displays, on the rear window, letters toward the outside of the vehicle, these letters may be perceived as being reversed by a person inside the vehicle, and as a result, the driver may have trouble with reading the letters. Therefore, when it is determined that the driver faces backward to directly view the letters on the basis of the information acquired from the driver sensor 200, the HUD device 500 may horizontally flip the letters displayed toward the outside of the vehicle, thereby enabling the driver to read the letters more easily. Optionally, the HUD device 500 may adjust a location and size of the letters on the rear window so that the driver is able to read the letters even more easily when facing backward.

When the driver views the letters displayed on the rear window toward the outside of the vehicle through the rearview mirror, he/she is able to read the letters easily without the need for any reversal process, because the reversed letters on the rearview mirror are perceived as being normal. Therefore, when it is determined that the driver views the letters through the rearview mirror on the basis of the information acquired from the driver sensor 200, the HUD device 500 may display the display toward the outside of the vehicle without performing any reversal process. Optionally, the HUD device 500 may adjust a location and size of the letters on the rear window so that the driver is able to read the letters even more easily through the rearview mirror. It is to be noted that the content of the display is not limited to letters. Non-limiting examples of the content of the display may include one or more characters, numbers, marks, signs, symbols, and pictures.

Figure 5:
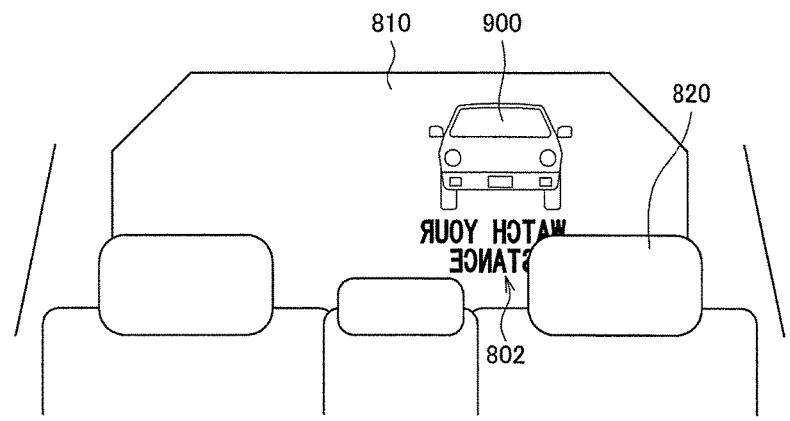
FIG. 5 schematically illustrates an example of a display on a rear window of the vehicle.
Figure 6:
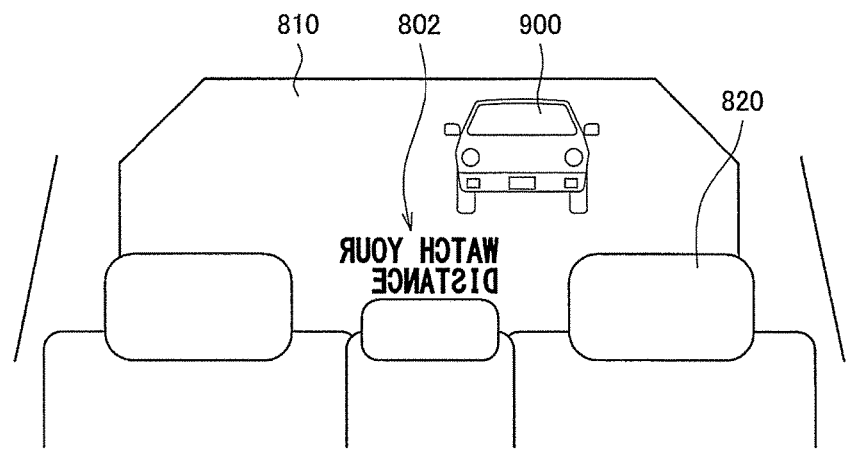
FIG. 6 schematically illustrates another example of the display on the rear window of the vehicle.
Figure 7:
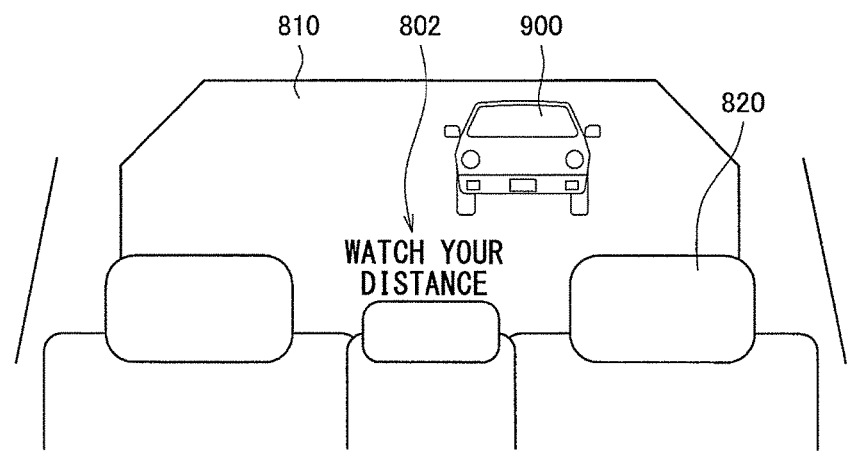
FIG. 7 schematically illustrates further another example of the display on the rear window of the vehicle.

Next, specific examples of a display provided are described with reference to some of the drawings. FIGS. 5 to 7 each schematically illustrate an example of a display on a rear window 810 of the vehicle. In one example implementation illustrated in FIGS. 5 to 7, the driver may find another vehicle 900 following the vehicle through the rear window 810. This vehicle 900 is called the following vehicle 900. In such an implementation, the environment state determiner 407 serving as the following vehicle information determiner may determine that the following vehicle 900 is coming close to the vehicle, on the basis of the information acquired by the environment information acquiring unit 402 serving as the following vehicle information acquiring unit. In response, the HUD controller 414 may control the displaying of the HUD device 500 to provide a vehicle-exterior display 802 on the rear window 810. FIG. 5 illustrates a state where the driver has not yet viewed the rearview mirror and where the vehicle-exterior display 802 that indicates a message saying "WATCH YOUR DISTANCE" is provided on the rear window 810 with its geometry and location modified so that a driver of the following vehicle 900 is able to view the vehicle-exterior display 802 easily.

FIG. 6 illustrates a modification of the display in the state of FIG. 5 which is made when the driver looks at the rearview mirror. In FIG. 6, the vehicle-exterior display 802 may be provided on the rear window 810 at a location different from that in FIG. 5 so that the driver of the vehicle is able to understand the content of the vehicle-exterior display 802 more easily. In FIG. 5, the vehicle-exterior display 802 that indicates the message saying "WATCH YOUR DISTANCE" is hidden behind a headrest 820 of a rear seat. In FIG. 6, however, the vehicle-exterior display 802 is changed in its location to be provided where the driver of the vehicle is able to readily read the message saying "WATCH YOUR DISTANCE" in the vehicle-exterior display 802 through the rearview mirror.

FIG. 7 illustrates a modification of a display in the state of FIG. 5 which is made when the driver faces backward. In FIG. 7, the vehicle-exterior display 802 is provided at a location different from that in FIG. 5, which is similar to the state of FIG. 6. In addition, the content of the vehicle-exterior display 802 is flipped horizontally so that the driver of the vehicle is able to understand the content of the vehicle-exterior display 802 more easily. As a result, when the driver faces backward, he/she is able to readily understand the message saying "WATCH YOUR DISTANCE" in the vehicle-exterior display 802. In this way, the driver is able to easily understand the content of the vehicle-exterior display 802 provided toward the driver of the following vehicle 900.

Information provided by the vehicle-exterior display 802 may be classified into three types, and the HUD device 500 may provide the vehicle-exterior display 802 in different modes related to these types. The types may be as follows. Information classified as a first type may be necessary for both of the drivers of the own vehicle and the following vehicle 900. An example of the information classified as the first type may be the message saying "WATCH YOUR DISTANCE", which may be provided, for example when the vehicle and the following vehicle 900 are running at an increasing relative velocity. Information classified as a second type may be necessary preferentially for the driver of the following vehicle 900. An example of the information classified as the second type may be a message saying "WATCH OUT FOR FRONT CAR", which may be provided, for example when the following vehicle 900 suddenly comes close to the vehicle. Another example may be "TRAFFIC JAM AHEAD". Information classified as a third type may be necessary preferentially for the driver of the own vehicle. Examples of the information classified as the third type may include a message saying "DETECT VEHICLE IN BLIND SPOT", a back guide, and a detection result of sonar.

The vehicle-exterior displays 802 in FIGS. 5 to 7 may be examples of the information classified as the first type. If the vehicle-exterior display 802 is the information classified as the first type, the vehicle-exterior display 802 may selectively employ a display mode, depending on whether the driver views the vehicle-exterior display 802 through the rearview mirror or faces backward to directly view the vehicle-exterior display 802. In an example implementation, when the driver of the vehicle views the vehicle-exterior display 802 through the rearview mirror, the location and size of the vehicle-exterior display 802 may be modified optimally without being horizontally flipped. When the driver of the vehicle faces backward to directly view the vehicle-exterior display 802, the location and geometry of the vehicle-exterior display 802 may be modified so that the driver of the own vehicle is able to view the vehicle-exterior display 802 more easily. In addition, when the driver faces backward to directly view the vehicle-exterior display 802, the content of the vehicle-exterior display 802 may be horizontally flipped if the content is, for example, letters. It is to be noted that the information classified as the first type may be displayed and modified preferentially for the driver of the own vehicle, because it is unclear whether the driver of the following vehicle 900 will actually change his/her driving behavior in response to the vehicle-exterior display 802.

If the vehicle-exterior display 802 is the information classified as the second type, the location and geometry of the vehicle-exterior display 802 may be modified so that the driver of the following vehicle 900 is able to view the vehicle-exterior display 802 more easily. In one example implementation, the vehicle-exterior sensors 100 disposed in the rear portion of the vehicle may detect a positional relationship between the own vehicle and the following vehicle 900 and a location of the driver of the following vehicle 900. In response, the HUD device 500 may provide the driver of the following vehicle 900 with the vehicle-exterior display 802 at an appropriate location. In one specific but non-limiting implementation, this appropriate location may be within an area hidden behind the headrest 820. A reason is that, when the driver of the vehicle looks at the rearview mirror or faces backward to check the rear area, it is necessary to move the vehicle-exterior display 802 to within his/her blind spot in order to suppress the vehicle-exterior display 802 from impairing the driver's rearward visibility.

If the vehicle-exterior display 802 is the information classified as the third type, the vehicle-exterior display 802 may be displayed in advance on the rear window 810 where the driver of the vehicle is able to view the vehicle-exterior display 802 more easily when looking at the rearview mirror or facing backward to check the rear area.

Figure 8:
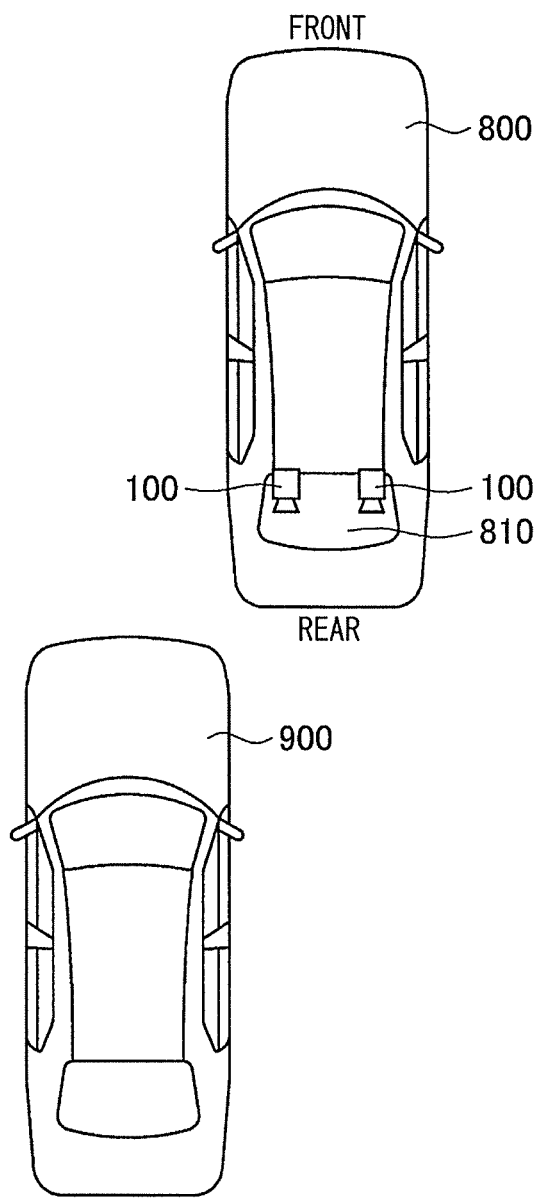
FIG. 8 schematically illustrates an example of a vehicle-exterior display provided on the basis of an estimation of a location of another vehicle following the vehicle.
Figure 9:
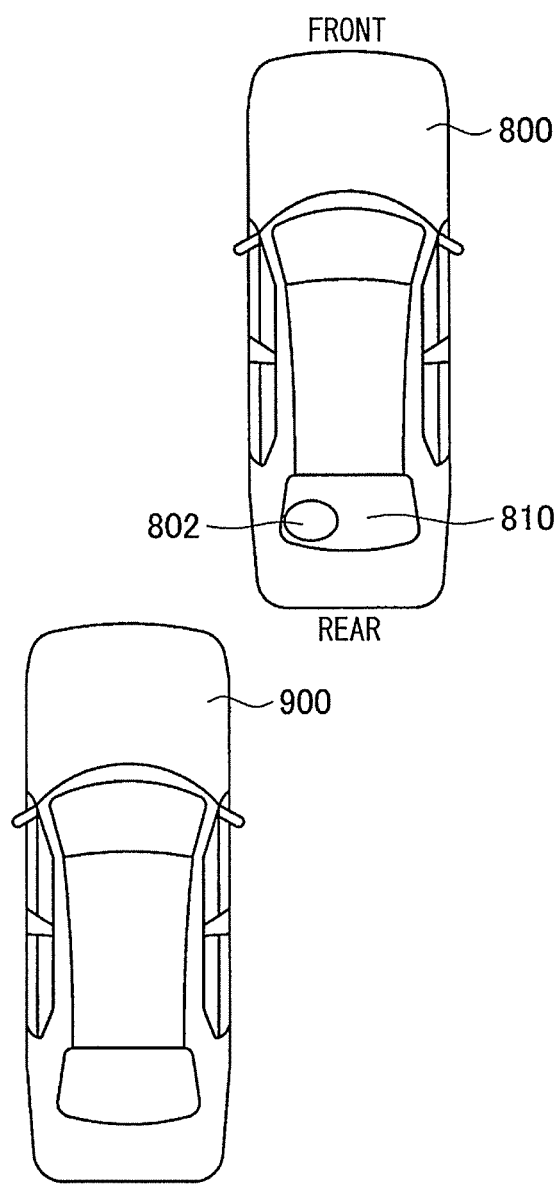
FIG. 9 schematically illustrates another example of the vehicle-exterior display provided on the basis of the estimation of the location of the vehicle following the vehicle.

FIGS. 8 and 9 each schematically illustrate a vehicle-exterior display provided on the basis of an estimation of a location of the following vehicle 900. FIG. 8 schematically illustrates the estimation of the location of the following vehicle 900. As illustrated in FIG. 8, the location of the following vehicle 900 may be estimated from the image information acquired from the vehicle-exterior sensors 100 disposed in the rear portion of a vehicle 800. In one specific but non-limiting implementation, the environment information acquiring unit 402 may acquire positional information on the following vehicle 900 on the basis of the image information obtained from the vehicle-exterior sensors 100. After having acquired the positional information on the following vehicle 900, the HUD device 500 may provide the vehicle-exterior display 802 on the rear window where the driver of the following vehicle 900 is able to view the vehicle-exterior display 802 more easily, as illustrated in FIG. 9.

In FIG. 8, the following vehicle 900 is positioned on the diagonally rear left of the vehicle 800. In such an implementation, the vehicle-exterior display 802 may be provided in a left portion of the rear window 810, as illustrated in FIG. 9. The HUD controller 414 may control the displaying of the HUD device 500 to provide the vehicle-exterior display 802 on the left portion of the rear window 810, on the basis of the positional information on the following vehicle 900 obtained by the environment information acquiring unit 402. In an alternative example implementation, the environment information acquiring unit 402 may acquire a direction of a line of sight of a driver in the following vehicle 900. On the basis of the direction of the line of sight, then, the HUD controller 414 may control the displaying of the HUD device 500 to provide the vehicle-exterior display 802 on the rear window 810 where the driver of the following vehicle 900 is able to view the vehicle-exterior display 802 more easily.

Figure 10:
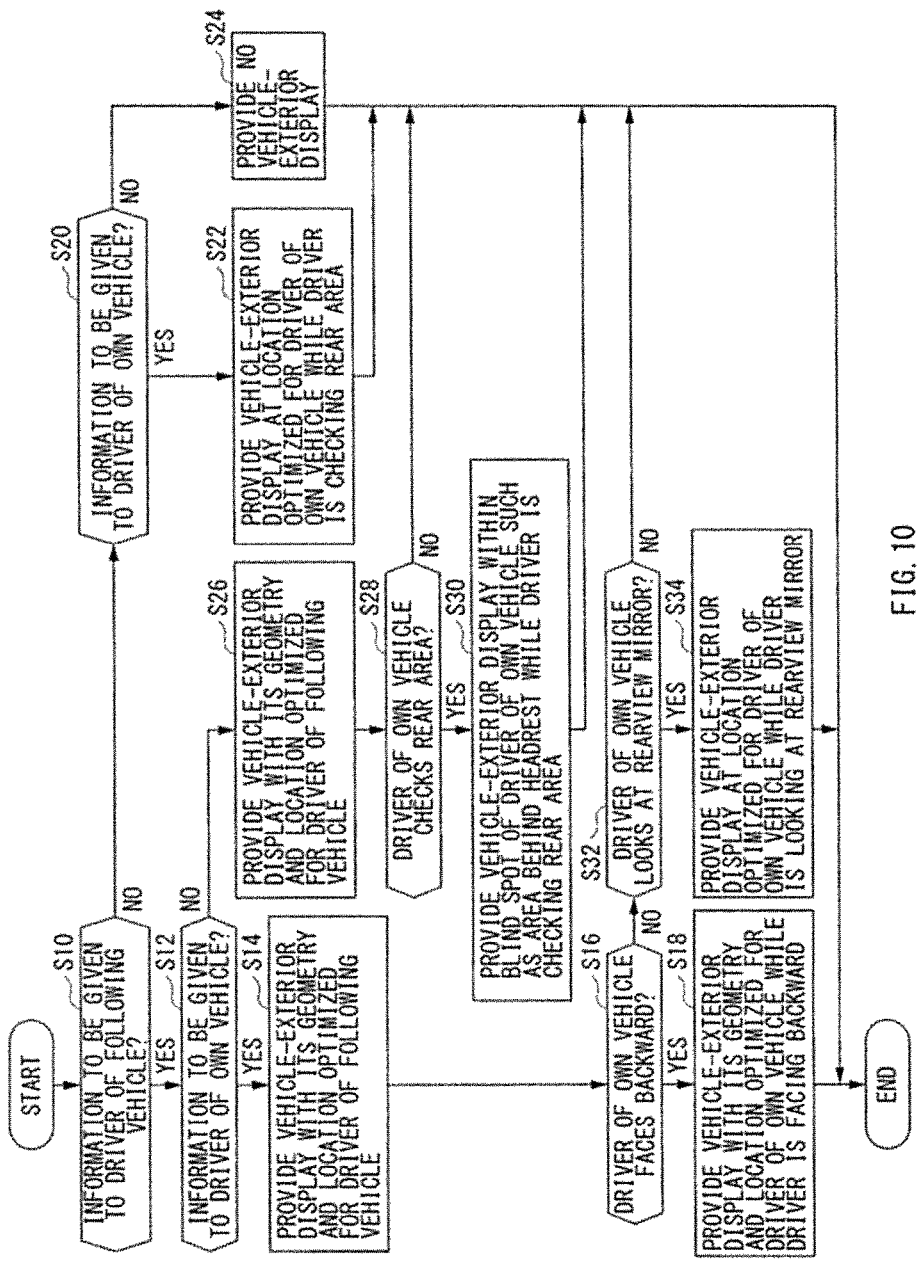
FIG. 10 is a flowchart of an example of a process performed by the vehicle display system according to one implementation.

Next, a description is given of an example of a process performed by the vehicle display system 1000 according to one implementation, with reference to a flowchart of FIG. 10. The process of FIG. 10 is performed by the components of the controller 400 and is repeated during predetermined control periods. In step S10, the HUD controller 414 may determine whether there is information to be given to the driver of the following vehicle 900. When the HUD controller 414 determines that there is information to be given to the driver of the following vehicle 900 (S10: YES), the flow may proceed to step S12. In step S12, the HUD controller 414 may determine there is information to be given to the driver of the own vehicle. When the HUD controller 414 determines that there is information to be given to the driver of the own vehicle (S12: YES), the flow may proceed to step S14. In step S14, while the driver of the own vehicle is looking ahead, the HUD controller 414 may control the displaying of the HUD device 500 to provide the vehicle-exterior display 802 on the rear window 810 with its geometry and location modified so that the driver of the following vehicle 900 is able to view the vehicle-exterior display 802 easily.

In step S16, the driver state determiner 406 may determine whether the driver of the own vehicle faces backward. When the driver state determiner 406 determines that the driver of the own vehicle faces backward (S16: YES), the flow may proceed to step S18. In step S18, while the driver of the own vehicle is facing backward, the HUD controller 414 may control the displaying of the HUD device 500 to provide the vehicle-exterior display 802 on the rear window 810 with its geometry and location modified so that the driver of the own vehicle is able to view the vehicle-exterior display 802 easily. As a result, the location of the vehicle-exterior display 802 may be changed, and the content of the vehicle-exterior display 802 may be horizontally flipped, as illustrated in FIG. 6.

When the HUD controller 414 determines that there is no information to be given to the driver of the following vehicle 900 in step S10 (S10: NO), the flow may proceed to step S20. In step S20, the HUD controller 414 may determine whether there is information to be given to the driver of the own vehicle. When the HUD controller 414 determines that there is information to be given to the driver of the own vehicle (S20: YES), the flow may proceed to step S22. In step S22, while the driver is checking a rear area, the HUD controller 414 may control the displaying of the HUD device 500 to provide the vehicle-exterior display 802 on the rear window 810 with its location modified so that the driver of the own vehicle is able to view the vehicle-exterior display 802 easily. When the HUD controller 414 determines that there is no information to be given to the driver of the own vehicle in step S20 (S20: NO), the flow may proceed to step S24. In step S24, the HUD controller 414 may control the displaying of the HUD device 500 not to provide the vehicle-exterior display 802 on the rear window 810, after which the process is ended (END).

When the HUD controller 414 determines that there is no information to be given to the driver of the own vehicle in step S12 (S12: NO), the flow may proceed to step S26. In step S26, the HUD controller 414 may control the displaying of the HUD device 500 to provide the vehicle-exterior display 802 on the rear window 810 with its geometry and location modified so that the driver of the following vehicle 900 is able to view the vehicle-exterior display 802 easily. After step S26 has been performed, the flow may proceed to step S28, in which the driver state determiner 406 may determine whether the driver of the own vehicle checks the rear area. When the driver state determiner 406 determines that the driver of the own vehicle checks the rear area (S28: YES), the flow may proceed to step S30. In step S30, while the driver of the own vehicle is checking the rear area, the HUD controller 414 may control the displaying of the HUD device 500 to provide the vehicle-exterior display 802 within a blind spot of the driver of the own vehicle, such as but not limited to the area hidden behind the headrest 820. As a result, it is possible to prevent the vehicle-exterior display 802 from impairing the driver's rearward visibility, thereby enabling the driver of the own vehicle to view the rear area widely. After step S30 has been performed, the process may be ended (END).

When the driver state determiner 406 determines that the driver of the own vehicle does not face backward in step S16 (S16: NO), the flow may proceed to step S32. In step S32, the driver state determiner 406 may determine whether the driver of the own vehicle looks at the rearview mirror. When the driver state determiner 406 determines that the driver of the own vehicle looks at the rearview mirror (S32: YES), the flow may proceed to step S34. In step S34, while the driver of the own vehicle is looking at the rearview mirror, the HUD controller 414 may control the displaying of the HUD device 500 to provide the vehicle-exterior display 802 on the rear window 810 where the driver of the own vehicle is able to view the vehicle-exterior display 802 easily. As a result, the location of the vehicle-exterior display 802 is changed, as illustrated in FIG. 6. When the driver state determiner 406 determines that the driver of the own vehicle does not look at the rearview mirror in step S32 (S32: NO), the process may be ended (END).

According to one implementation, as described above, it is possible to, when providing a display on a window in a rear portion of a vehicle, optimize the display depending on whether the driver of the own vehicle checks the rear area. In one example implementation, when the driver faces backward or looks at the rearview mirror in order to check the rear area, the displaying of the HUD device 500 is controlled to change a content of the display on the rear window 810. In this way, it is possible to provide a display optimized for the driver who is checking the rear area.

The controller 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 400 illustrated in FIG. 1.

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display system comprising:
   a display device configured to provide a first image on a window in a rear portion of an own vehicle, the first image to be provided for a driver of the own vehicle and a driver of a proceeding vehicle, the first image being provided with a first display orientation and at a first display location on the window based on information of the proceeding vehicle;
   a driver state determiner configured to determine a state of a driver of the own vehicle; and
   when the state of the driver indicates that the driver faces backward to check a rear area of the own vehicle, a display controller configured to adjust a display orientation of the first image from the first display orientation to a second display orientation by horizontally flipping the first image,
   wherein the display device provides the first image on a window in the rear portion of the vehicle based on the first display location and the second display orientation.

2. The vehicle display system according to claim 1, wherein, when the driver state determiner determines that the driver of the vehicle faces backward to check the rear area of the vehicle, the display controller adjusts a display location of the first image from the first display location to a second display location,
   wherein the display device provides the first image on the window in the rear portion of the vehicle based on the second display location and the second display orientation.

3. The vehicle display system according to claim 1, wherein
the vehicle comprises a rearview mirror, and
when the state of the driver indicates that the driver of the vehicle checks the rear area of the vehicle using the rearview mirror, the display controller adjusts a display location of the first image from the first display location to a third display location,
wherein the display device provides the first image on the window in the rear portion of the vehicle based on the third display location and the first display orientation.

4. The vehicle display system according to claim 1, wherein the first display location on the window is within a blind spot of the driver of the vehicle.

5. The vehicle display system according to claim 2, wherein the first display location on the window is within a blind spot of the driver of the vehicle.

6. The vehicle display system according to claim 3, wherein the first display location on the window is within a blind spot of the driver of the vehicle.

7. The vehicle display system according to claim 1, wherein a display location of the first image is adjusted further in accordance with a state of the proceeding vehicle determined based on the information of the proceeding vehicle.

8. The vehicle display system according to claim 2, wherein the display location of the first image is further adjusted in accordance with a state of the proceeding vehicle determined based on the information of the proceeding vehicle.

9. The vehicle display system according to claim 3, wherein the display location of the first image is further adjusted in accordance with a state of the proceeding vehicle determined based on the information of the proceeding vehicle.

10. A method of controlling a vehicle display system, the method comprising:
determining a state of a driver of an own vehicle; and
when the state of the driver indicates that the driver checks a rear area of the own vehicle providing, for display via a display device, a first image with a first display orientation and a first display location on a window in a rear portion of the own vehicle, wherein
when the state of the driver indicates that the driver of the vehicle checks the rear are of the vehicle using a rearview mirror of the own vehicle:
a display location of the first image is adjusted from the first display location to a second display location; and
the first image is provided, for display via the display device, with the first display orientation and a second display location on the window, and
when the state of the driver indicates that the driver of the vehicle faces backward to check the rear are of the vehicle:
a display orientation of the first image is adjusted from the first display orientation to a second display orientation by horizontally flipping the first image;
the display location of the first image is adjusted from the first display location to a third display location; and
the first image is provided, for display via the display device, with the second display orientation and the third display location on the window.

11. A vehicle display system comprising:
a display device; and
circuitry configured to;
determining a state of a driver of an own vehicle; and
when the state of the driver indicates that the driver checks a rear area of the own vehicle providing, for display via the display device, a first image with a first display orientation and a first display location on a window in a rear portion of the own vehicle,
wherein when the state of the driver indicates that the driver of the vehicle faces backward to check the rear are of the vehicle:
a display orientation of the first image is adjusted from the first display orientation to a second display orientation by horizontally flipping the first image;
a display location of the first image is adjusted from the first display location to a second display location; and
the first image is provided, for display via the display device, with the second display orientation and the second display location on the window.

12. The vehicle display system according to claim 11, wherein when the state of the driver indicates that the driver of the vehicle checks the rear area of the vehicle using a rearview mirror of the own vehicle:
the display location of the first image is adjusted from the first display location to a third display location; and
the first image is provided, for display via the display device, with the first display orientation and the third display location on the window.

* * * * *